(12) United States Patent
London et al.

(10) Patent No.: US 10,078,809 B2
(45) Date of Patent: Sep. 18, 2018

(54) FREIGHT TRACKING SYSTEM AND METHOD

(71) Applicants: Vernice London, Victorville, CA (US); Timothy La More Parker, Apple Valley, CA (US); Micheal Morgan, Indianola, NE (US)

(72) Inventors: Vernice London, Victorville, CA (US); Timothy La More Parker, Apple Valley, CA (US); Micheal Morgan, Indianola, NE (US)

( * ) Notice: Subject to any disclaimer, the term of this patent is extended or adjusted under 35 U.S.C. 154(b) by 889 days.

(21) Appl. No.: 14/616,453

(22) Filed: Feb. 6, 2015

(65) Prior Publication Data

US 2016/0232483 A1 Aug. 11, 2016

Related U.S. Application Data

(60) Provisional application No. 61/944,622, filed on Feb. 26, 2014.

(51) Int. Cl.
*G08B 13/14* (2006.01)
*G06Q 10/08* (2012.01)

(52) U.S. Cl.
CPC .............. *G06Q 10/0833* (2013.01)

(58) Field of Classification Search
CPC . G06Q 10/0833; G06K 7/10366; G08B 13/14
USPC ........ 340/572.1–572.7, 539.12, 539.29, 506, 340/545.6, 870.1; 235/382, 385, 492
See application file for complete search history.

(56) References Cited

U.S. PATENT DOCUMENTS

| | | | | |
|---|---|---|---|---|
| 2005/0248456 A1* | 11/2005 | Britton, Jr. | ............. | G06Q 10/08 340/539.29 |
| 2006/0109106 A1* | 5/2006 | Braun | .................... | G06Q 10/08 340/539.13 |
| 2009/0322510 A1* | 12/2009 | Berger | .................. | G06Q 10/08 340/539.1 |
| 2011/0055172 A1* | 3/2011 | Tan | .................. | G06F 17/30241 707/692 |
| 2013/0154829 A1* | 6/2013 | Mostov | .................. | G08B 13/22 340/539.13 |

\* cited by examiner

*Primary Examiner* — Tai T Nguyen
(74) *Attorney, Agent, or Firm* — Gulf Coast Intellectual Property Group (57) ABSTRACT

A freight tracking system and method of use that is operable to track a shipment batch wherein the shipment batch comprises of a plurality of pieces and wherein each piece of the shipment batch is communicably coupled. The freight tracking system further includes a database, controller, remote terminals, warehouse gateways and a plurality of asset tags. The asset tags are communicably coupled with each other and further communicably paired with at least one warehouse gateway. The asset tags maintain communication intermediate each other and further include a display screen and a visual warning indicator. A proximity distance parameter is established for a group of asset tags that are assigned to a particular shipment batch. The asset tags within the assigned shipment batch are operable to provide notification to the users of the freight tracking system upon the exceeding of the proximity distance parameter.

20 Claims, 4 Drawing Sheets

FREIGHT TRACKING SYSTEM AND METHOD

PRIORITY UNDER 35 U.S.C. SECTION 119(E) & 37 C.F.R. SECTION 1.78

This nonprovisional application claims priority based upon the following prior U.S. Provisional Patent Application entitled: Freight Tracking Apparatus, Application No. 61/944,622 filed Feb. 26, 2014, in the name of Vernice London, which is hereby incorporated by reference for all purposes.

FIELD OF THE INVENTION

The present invention relates generally to package tracking systems, more specifically but not by way of limitation, a freight tracking system that functions to identify the components of a group shipment and further provide tracking of each component so as to ensure that each component maintains a proximity to each other during shipment.

BACKGROUND

Millions of packages and pallets are shipped every day in the United States. The logistics industry is a key part of the business infrastructure of the United States economy. There are many manners in which products are shipped across the United States and other parts of the world. For example but not by way of limitation, products can be placed on pallets or they can be organized in boxes and other similar techniques. It is very common for a shipment of products to include a batch of either pallets or boxes. These batches are shipped together in so as to provide the proper order fulfillment.

One problem with current shipping practices in the lack of tracking the components of a grouped shipment. While there does exist techniques and technology to track a single item such as but not limited to a box or a pallet, there is no current technology that is capable of establishing an interdependency between a group of pallets or boxes to be shipped as a batch and subsequently track the proximity of each component to each other during the shipping process.

Another issue with existing tracking technology is that it is limited as to where the items can be tracked. By way of example not by limitation, current pallets utilize GPS technology to establish the location thereof and track via a software application. Once loaded into a trailer these items cannot be tracked via GPS satellites as the signal reception is blocked during transit. These systems are able to determine when and where a pallet was loaded into a trailer but additional programming is required to link destination and additional shipping information. Further, while this technology tracks the location of a single pallet, it is not capable of establishing location proximity interdependence between pallets or other shipping apparatus such as but not limited to a trailer.

Accordingly, it is desirable that a freight tracking system be provide that is operable to track the geographic location of an item being shipped and further be able to be linked to additional items being shipped wherein a system provides alerts if the proximity of the linked items exceeds a certain distance or if one or more of the batched shipment is removed from an assigned trailer at a location other than the desired location.

SUMMARY OF THE INVENTION

It is the object of the present invention to provide a freight tracking system that includes a software application component that is loaded on a computer or similar device that provides the ability to control and operate the freight tracking system.

Another object of the present invention is to provide a freight tracking system that includes a tracking sticker that is operable to be secured to each item being shipped wherein the tracking sticker is utilized to establish geographical location of the item and further provide interdependency between a plurality of items being shipped.

A further object of the present invention is to provide a freight tracking system that is operable to track a batched shipment wherein the batched shipment includes more than one item and provide an alert within the system if at least one of the items in the batched shipment is moved away from the other items in the batched system wherein the distance is greater than a programmed allowed distance.

An additional object of the present invention is to provide a freight tracking system that is operable to track a batched shipment consisting of a plurality of items wherein the freight tracking apparatus further establishes proximity interdependency between each item of the batch that further includes tracking stickers that are operable to provide visual notification. The visual notification includes a first color and a second color wherein the second color is displayed in the event the item has been removed from its batch at a distance greater than programmed.

Still a further object of the present invention is to provide a freight tracking system that is operable to provide tracking of individual items of a batched shipment wherein the software of the freight tracking apparatus is programmed with information such as but not limited to billing information, shipper, pro number, quantity within batch and destination.

Yet another object of the present invention is to provide a freight tracking system that is operable to provide tracking of a batched shipment and establish a proximity interdependency between each item wherein the freight tracking system further includes monitoring of each item during the loading process and is further operable to provide alert if at least one item is not loaded and the trailer has moved a distance greater than a programmed distance.

Another object of the present invention is to provide a freight tracking system that is operable to provide tracking of a shipment wherein the shipment includes a plurality of items that further is capable of monitoring the status of the shipping container that is being utilized to transport the shipment.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Referring now to the drawings submitted herewith, wherein various elements depicted therein are not necessarily drawn to scale and wherein through the views and figures like elements are referenced with identical reference numerals, there is illustrated a freight tracking system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 1:
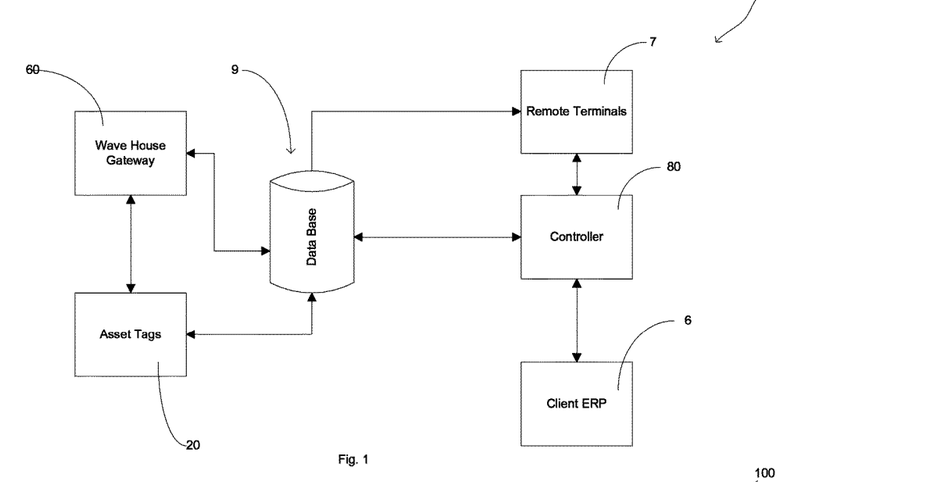
FIG. 1 is a diagram of the general system topology of the present invention.
Figure 2:
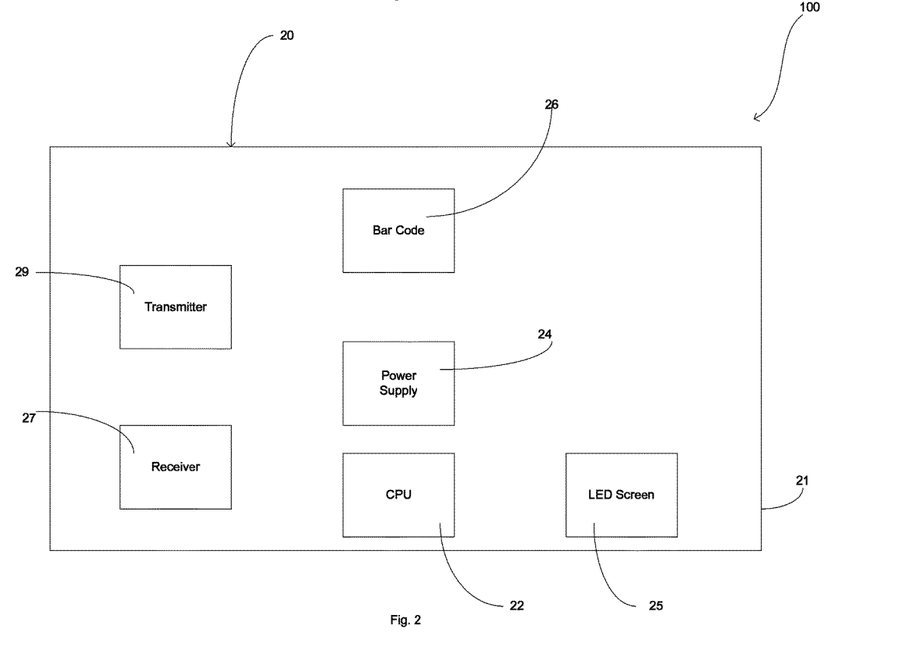
FIG. 2 is a block diagram of a asset tag of the present invention.

Referring in particular to FIGS. 1 through 4, a discussion of the hardware components of the freight tracking system 100 is as follows. A block diagram of the asset tag 20 of the present invention is illustrated in FIG. 2 herein. The asset tag 20 includes housing 21 that is manufactured from a durable suitable material such as but not limited to plastic. The asset tag 20 is designed to be releasably secured to an item that is to be transported via truck or other similar method. The asset tag 20 includes a central processing unit 22 that contains a conventional integrated circuit providing the functionality to store, receive, transmit and manipulate data. Further included in the asset tag 20 is a transmitter 29 and receiver 27. The transmitter 29 and receiver 27 function to receive and transmit signals via a mesh network utilizing suitable communication protocols to other components within the freight tracking system 100 so as to provide location information of the asset tag 20. It is contemplated within the scope of the present invention that the asset tag 20 be provided in more than one embodiment wherein the types of signals transmitted and received vary. In its preferred embodiment the asset tag 20 includes the transmitter 29 and receiver 27 wherein the asset tag 20 is configured to operate in a mesh network configuration such that each asset tag 20 is operable to communicate with the warehouse gateway 60 and any additional paired asset tags 20 during the transportation process. The asset tag 20 further includes a conventional bar code, which is utilized to assign an asset tag to a particular batch for shipment wherein the barcode information is entered into the controller 80. A visual warning indicator 28 is further integrated into the asset tag 20. The visual warning indicator 28 is operable to provide a visual signal if the asset tag 20 is detected in an improper location. More specifically but not by way of limitation, an example of an improper location could be an asset tag 20 that has been separated from another asset tag 20 at a distance greater than prescribed. Additionally, the visual warning indicator 28 would provide a visual signal if an asset tag 20 has not been loaded onto a desired trailer and the trailer and the trailer has initiated its delivery route. It is contemplated within the scope of the present invention that the visual warning indicator 28 includes a first color and a second color. The first color is displayed when the freight tracking system 100 detects that all parameters for the asset tag 20 are as defined. The second color of the visual warning indicator 28 is displayed when a defined parameter for the asset tag 20 is not present. By way of example but not limitation, if an asset tag 20 is detected at a distance greater than 60 feet from another asset tag 20 that has been assigned to the same shipment batch, the visual warning indicator 28 would illuminate a red color so as to provide a visual signal that a problem exists. Additionally, if an asset tag 20 is detected with all parameters meeting defined criteria, the visual warning indicator 28 would display its first color, which is green. It is contemplated that various colors could be utilized for the first color and second color of the visual warning indicator 28. Furthermore, it is known in the art that trailers utilized for shipping can be up to fifty-three feet in length. It is contemplated within the scope of the present invention that the asset tag 20 could be programmed with a proximity distance parameter that could be greater or less than fifty-three feet so as to monitor the position thereof during the transportation process. More specifically but not by way of limitation, it is contemplated within the scope of the present invention that the proximity distance parameter could be programmed within the range of 30 to 150 feet. The asset tag 20 further includes a conventional power supply 24 that is operable to provide power for the asset tag 20. It is contemplated within the scope of the present invention that the asset tag 20 could transmit signals either on a continuous basis or at prescribed intervals.

Figure 3:
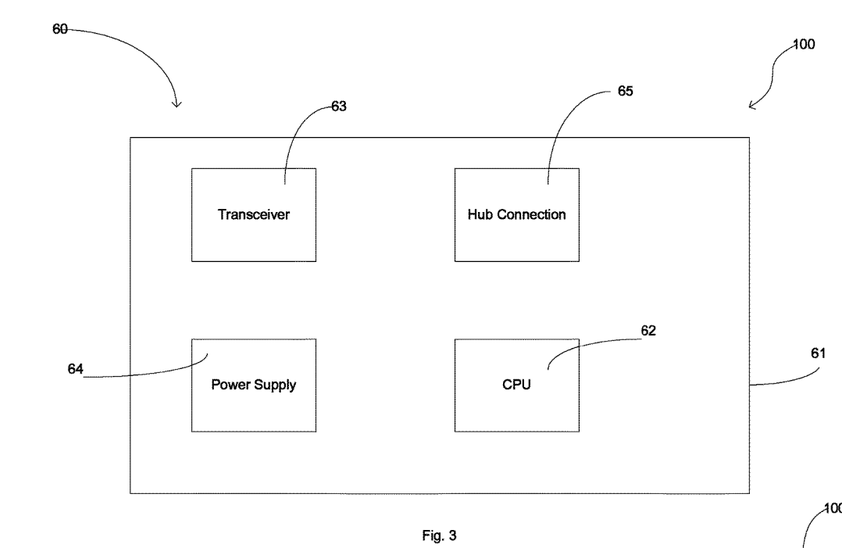
FIG. 3 is a block diagram of the warehouse gateway of the present invention.

Referring in particular to FIG. 3 herein, a block diagram of the warehouse gateway 60 is provided. The warehouse gateway 60 functions as the hub connection for all of the asset tags 20 assigned to a particular shipping batch. The warehouse gateway 60 functions to provide monitoring and information regarding more than one batch simultaneously. The warehouse gateway 60 includes housing 61 that is manufactured from a suitable durable material. Enclosed within the housing 61 is a central processing unit 62 that contains a conventional integrated circuit that is operable to receive, store, transmit and manipulate data. A transceiver 63 is present and the transceiver 63 is operable to transmit and receive signals to and from the asset tags 20. The transceiver 63 is configured to operate utilizing suitable mesh network communication protocols. A hub connection 65 is provided and the hub connection 65 is operable to provide data to the database 9 of the freight tracking system 100. The hub connection 65 is contemplated to be either wired or wireless and can be connected to the database 9 or other components of the freight tracking system 100 such as but not limited to the controller 8 or remote terminals 7. The warehouse gateway 60 includes a conventional power supply 64 and it is contemplated within the scope of the present invention that the power supply could be configured to either be conventional AC power or a battery.

Figure 4:
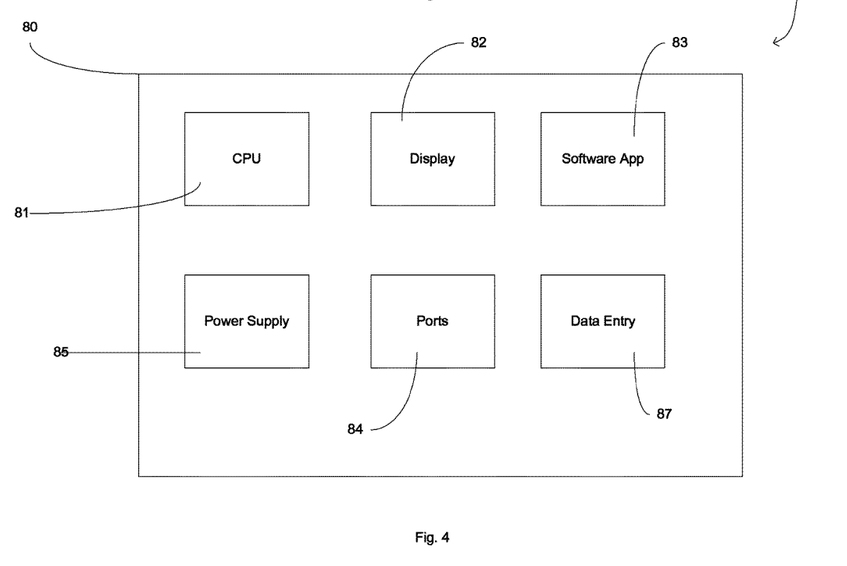
FIG. 4 is a block diagram of the controller of the present invention.

Referring in particular to FIG. 4 herein, a block diagram of the controller 80 is illustrated therein. The controller 80 includes a conventional central processing unit 81 that is operable to store, receive, transmit and manipulate data. The controller 80 can be embodied as either a conventional PC and further include a plurality of remote tablet PC's. Stored within the controller 80 is the software application 83 that functions to provide and control the operation of the freight tracking system 100. The software application 83 is executed across all controllers 80 that are present in the freight tracking system 100 and can further be operational on a remote system such as but not limited to a third party client ERP. The controller 80 further includes a plurality of connection ports 84 that are operable to provide connectivity to the database 9, remote terminals 7 and client ERP. The connection ports 84 are configured to be either wired or wireless connections and can utilize connection protocols such as but not limited to TCPIP or GSM/GPRS. Those skilled in the art will recognize that the controller 80 could be configured to utilize numerous types of connectivity protocols. The controller 80 includes a conventional power supply 85 that is operable to provide the necessary power for operation. A display screen 82 and data entry device 87 such as a keyboard are also present. It is contemplated within the scope of the present invention that the software application 83 could be a browser based application operable and stored on a remote database wherein users of the system could access through any conventional PC's or similar devices such as but not limited to tablet PC's or smart phones.

An overview of the system topology of the freight tracking system 100 is illustrated in FIG. 1. All elements of the system are connected utilizing the aforementioned protocols and controlled by the controller 80 so as to provide shipment tracking. The controller 80 is operable to facilitate the data transfer and manipulation related to each shipment batch that is logged into the freight tracking system 100. The remote terminals 7 can be configured to be devices such as but not limited to bar code readers and other mobile devices. Users of the remote terminals can assign a batch identification to a plurality of objects scheduled for transportation utilizing either the controller 80 or remote terminals 7. The asset tags 20 are grouped via the bar code 26 and entered into the software application 83 with required data such as but not limited to batch size, route information and other shipment details. This information is stored in the database 9 and can further be transmitted to the client ERP. The shipment information is accessible utilizing the software application 83 that is stored on either the controller 80 or the remote terminals 7. Data is transmitted by the asset tags 20 and the warehouse gateway 60 during the shipping process and functions to ensure that all asset tags 20 grouped together in a shipment batch maintain proximity to each other and further arrive at the programmed destination. During the shipping process if defined parameters are not met, alerts are provided to users of the freight tracking system 100 as to the out of tolerance parameter.

Figure 5A:
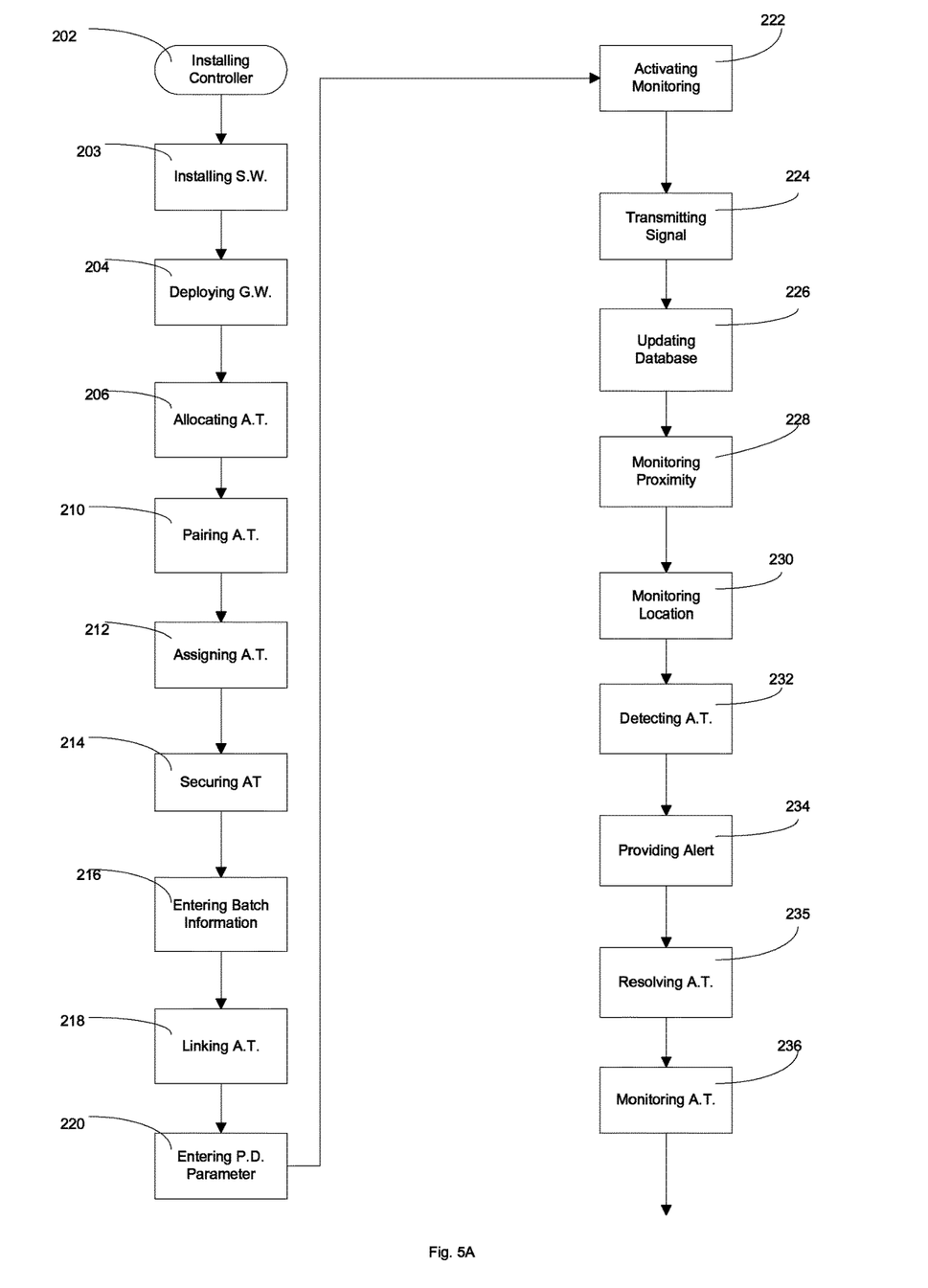
FIG. 5a is a flowchart of an exemplary process flow of the present invention.

Now referring in particular to FIG. 5, a flowchart of the process flow is illustrated therein. Beginning in step 202 the controller 80 is installed in the desired location. This can be in a location such as but not limited to a warehouse office or other facility and will include connecting the controller 80 to the Internet or other communication network. Step 203, the software application of the freight tracking apparatus 100 is installed on the controller 80 and is further installed on any remote terminals 7 that will be utilized in the freight tracking system 100. Step 204, at least one warehouse gateway 60 is deployed and operably coupled to the other elements of the freight tracking system 100. In step 206, a user of the freight tracking system 100 will allocate a plurality of asset tags 20. Step 210, the asset tags 20 will be paired with the deployed warehouse gateway 60. Subsequent the pairing of the asset tags 20 and the warehouse gateway 60 the information is stored within the controller 80.

In step 212, the user will assign more than one asset tag 20 to a shipment batch identification number. This assignment of asset tags 20 to a shipment batch identification number can occur utilizing the barcode 26 located on the asset tag 20 or it can be manually entered into the controller 80. Step 214, the user will releasably secure the asset tags 20 to assigned cargo such as but not limited to a pallet or box. In step 216, the user will enter into the controller 80 information concerning shipment batch identification number. This information can include but is not limited to route information, billing information, quantity of pieces, destination and consignee. Step 218, if the alternative embodiment of the asset tags 20 have been deployed that are capable of connecting in a mesh network, the user will utilize the controller 80 or remote terminals 7 to link the asset tags 20 assigned to the same shipment batch identification number into a mesh network wherein the assets tags 20 assigned in the mesh network are operably coupled and will receive and transmit signals to each other in addition to communicating with the warehouse gateway 60. In step 220, using either the controller 80 or remote terminals 7, a user will enter a proximity distance parameter that is allowed between each asset tag 20 within the same shipment batch identification number. While no particular distance is required, good results have been achieved utilizing a proximity distance parameter of 53 feet.

Step 222, activation of the monitoring of the shipment batch assigned with the same shipment batch identification number begins. This information is displayed and available to a user of the freight tracking system 100 either via the controller 80 or the remote terminals 7. In step 224, transmitting and receiving of signals between the asset tags 20 and between the asset tags 20 and the warehouse gateway 60 commences. Step 226, the database 9 of the freight tracking system 100 is updated with the location and proximity parameter information of the shipment batch having a assigned shipment batch identification number. In step 228, the proximity of each asset tag 20 within a shipment batch having the same assigned shipment batch identification number is continually monitored wherein each asset tag 20 location within a shipment batch is monitored to ensure that the proximity distance parameter does not exceed tolerance.

In step 230, the freight tracking system 100 monitors the location of each asset tag 20 within a warehouse.

Figure 5B:
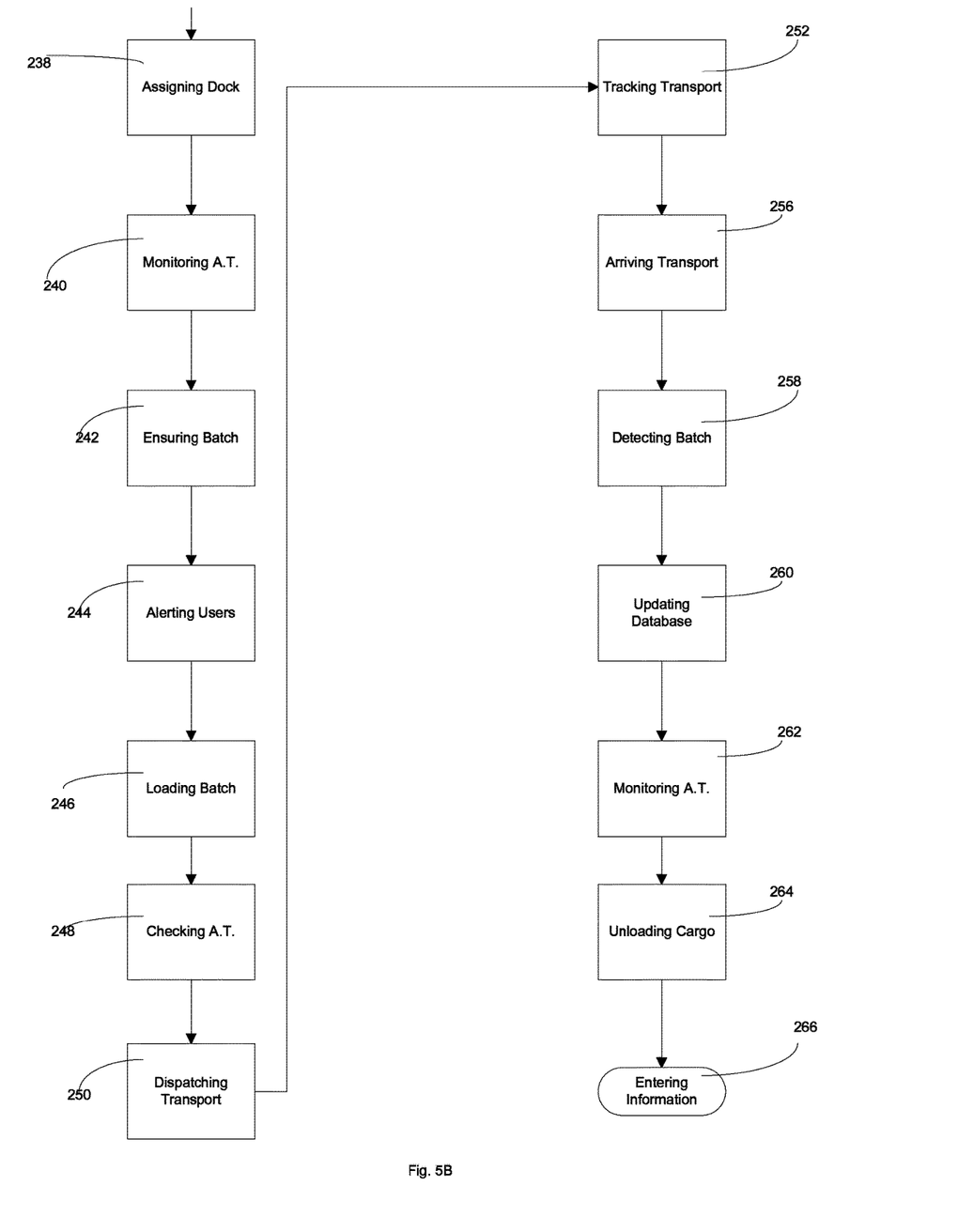
FIG. 5b is a continuation of the flowchart of the exemplary process flow of the present invention.

Step 232, the controller 80 has received a signal from the warehouse gateway 60 that at least one of the asset tags 20 within a shipment batch has exceeded the proximity distance parameter relative to another asset tag 20 within the same assigned shipment batch. In step 234, the freight tracking system 100 will provide alert to the users of the system that an asset tag 20 has exceeded the proximity distance parameter. This alert is accomplished by providing a notice on the remote terminals 7 and the controller 80. Additionally, this alert is provided by displaying the second color of the visual warning indicator 28 so as to alert an individual proximate the asset tag 20. Step 235, a user of the freight tracking system 100 will resolve the proximity distance parameter warning by physically grouping the cargo within the same assigned shipment batch within a distance that is less than that of the assigned proximity distance parameter. In step 236, the monitoring of the asset tags within an assigned shipment batch having the same shipment batch identification number will continue. Step 238, a user of the freight tracking system 100 will assign a loading dock location wherein the dock location is the assigned dock in a warehouse that the shipment batch having the same shipment batch identification number is scheduled to be loaded onto a transport device such as but not limited to a trailer. This dock assignment data is entered into the freight tracking system 100 and can further be displayed on a LED display screen of each asset tag 20. In step 240, the warehouse gateway 60 monitors the location of all of the asset tags 20 within the same shipment batch so as to ensure the shipment batch is positioned proximate the assigned loading dock. Step 242, the warehouse gateway 60 continuously monitors each asset tag 20 within the same assigned shipment batch so as to ensure that each asset tag 20 is proximate the assigned loading dock. Additionally, it should be recognized that during this step and all steps subsequent step 222, the freight tracking system 100 is monitoring each asset tag 20 within the same assigned shipment batch to ensure that the proximity distance parameter is not exceeded.

In step 244, if the warehouse gateway 60 detects that a shipment batch is located proximate a loading dock that is not the assigned loading dock, the freight tracking system 100 will provide an alert via the controller 80 and the remote terminals 7 so as to notify users of the freight tracking system 100 of the deviation in order to provide correction thereof. Step 246, comprises of loading the cargo having the asset tags 20 wherein the asset tags 20 are assigned the same shipment batch identification number onto a transport device for shipment. In step 248, the freight tracking system will check that all asset tags 20 within the same shipment batch so as to ensure proximity therebetween and to ensure loading onto the correct transport device. Step 250, the transport device is dispatched from the loading dock. In step 252, the geographical position of the transport device is monitored and its location is updated into the freight tracking system 100 using GPS data signals and conventional mapping software. Step 256, the transport device arrives at the required destination. In step 258, a warehouse gateway installed at the arrival location begins to detect the asset tags 20 secured to the cargo in the transport device utilizing mesh network communication protocols or similar technology. This data is received and routed to the controller 80 of the freight tracking system. Step 260, the freight tracking system 100 is updated with the arrival time and location of the transport device that is carrying thereon the shipment batch. In step 262, the warehouse gateway 60 installed at the destination commences monitoring of the asset tags 20 proximate thereto so as to ensure the proximity distance parameter is not exceeded. This includes the communication between each asset tag 20. Step 264, the cargo is unloaded from the transport device wherein all of the cargo having the asset tags 20 secured thereto and wherein the instant destination is the programmed destination for the shipment batch. In step 266, the warehouse gateway 60 detects the unloading of the cargo having the asset tags 20 allocated to be unloaded and provides an update to the freight tracking system 100 that the shipment is complete.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for tracking freight using a freight tracking system wherein the freight tracking system comprising steps of:

installing a controller, said controller being a personal computer, said controller being operably coupled a network;

installing at least one remote terminal, said remote terminal being a portable computing device;

installing a software application, said software application being installed on said controller and said at least one remote terminal, said software application operable to provide operation of the freight tracking system;

connecting the controller to a remote database;

deploying a warehouse gateway, said warehouse gateway being operably coupled to said at least one remote terminal and said controller, said warehouse gateway including a transceiver, said transceiver configured to transmit and detect a signal;

providing a plurality of asset tags, said asset tags having a housing, said asset tags being releasably secured to an item for shipment, said asset tags including a transmitter and receiver, said asset tags further including a visual warning indicator, said visual warning indicator operable to display a first color and a second color;

allocating a portion of said plurality of asset tags secured to a shipment of cargo, wherein the shipment of cargo includes a plurality of separate items;

pairing the portion of said plurality of asset tags selected for securement to a shipment to the warehouse gateway;

assigning the portion of said plurality of asset tags to a shipment batch, wherein the shipment batch is provided with a unique shipment batch identification number;

securing the portion of said plurality of asset tags paired with the warehouse gateway to the items within the shipment batch;

entering the shipment batch information into the software application;

linking the asset tags contained within the shipment batch, wherein communication between each asset tag within a shipment batch is established;

entering a proximity distance parameter, wherein the proximity distance parameter for each asset tag within the shipment batch is entered into the freight tracking system;

activating monitoring of each asset tag within the shipment batch;

updating the database with position information of each asset tag;

detecting that at least one asset tag has exceeded the proximity distance parameter;

alerting users of the freight tracking system, wherein the users of the freight tracking system are provided notification that an asset tag within a shipment batch has exceeded the proximity distance parameter;

correcting a location of the asset tag; and resuming the monitoring of the asset tags within a shipment batch.

2. The method for tracking freight as recited in claim 1, and further including a step of assigning a loading dock location for the shipment batch, said loading dock location being entered into the software application.

3. The method for tracking freight as recited in claim 2, wherein the step of entering the shipment batch information further includes inputting of the following data: route information, billing information, quantity of pieces within the shipment batch and consignee information.

4. The method for tracking freight as recited in claim 3, wherein the proximity distance parameter is 53 feet.

5. The method for tracking freight as recited in claim 4, wherein said asset tag further includes a display screen, said display screen operable to display the loading dock assignment for the shipment batch.

6. The method for tracking freight as recited in claim 5, wherein the first color of the visual warning indicator is illuminated during all asset tags within the shipment batch being within the proximity distance parameter.

7. The method for tracking freight as recited in claim 6, wherein the first color of said visual warning indicator is green and the second color of said visual warning indicator is red.

8. A method for tracking freight using a freight tracking system wherein the freight tracking system is operable to monitor the position of each piece of a shipment batch relative to each other comprising steps of:

installing a controller, said controller being a personal computer, said controller being operably coupled a network;

installing at least one remote terminal, said at least one remote terminal being a portable computing device, said at least one remote terminal being a tablet PC or a smart phone;

installing a software application, said software application being installed on said controller and said at least one remote terminal, said software application operable to provide operation of the freight tracking system;

establishing a database, said database being established on a server;

coupling the controller to the database, said coupling of the controller to the database being executed by a computer network connection;

deploying a warehouse gateway, said warehouse gateway being operably coupled to said at least one remote terminal and said controller, said warehouse gateway including a transceiver, said transceiver configured to transmit and detect a signal;

providing a plurality of asset tags, said plurality of asset tags having a housing, said asset tags being releasably secured to an item for shipment, said asset tags including a transmitter and receiver, said asset tags further including a visual warning indicator, said visual warning indicator operable to display a first color and a second color, said asset tags further including a display screen;

identifying a shipment batch, said shipment batch comprising of more than one item, wherein the shipment batch is scheduled to ship to a single destination;

allocating a portion of said plurality of asset tags, said portion of said plurality of asset tags being secured to the shipment batch;

pairing the portion of said plurality of asset tags selected for securement to the shipment batch to the warehouse gateway;

assigning the portion of said plurality of asset tags to the shipment batch, wherein the shipment batch is provided with a unique shipment batch identification number;

securing the portion of said plurality of asset tags assigned to the shipment batch;

entering shipment batch information into the software application, wherein the shipment batch information is inputted using a barcode located on said asset tag;

linking the asset tags contained within the shipment batch, wherein communication between each asset tag within a shipment batch is established, said linking the asset tags operable to establish a mesh network wherein each asset tag secured to an assigned shipment batch is communicably connected to each other;

entering a proximity distance parameter, wherein the proximity distance parameter for each asset tag within the shipment batch is entered into the freight tracking system;

activating monitoring of each asset tag within the shipment batch;

updating the database with position information of each asset tag, said updating the database occurring at regular intervals of time;

detecting that at least one asset tag has exceeded the proximity distance parameter between itself and another asset tag within the shipment batch;

alerting users of the freight tracking system, wherein the users of the freight tracking system are provided notification that an asset tag within a shipment batch has exceeded the proximity distance parameter;

identifying a location of the asset tag within the shipment batch that is providing the signal that it has exceeded the proximity distance parameter;

correcting the location of the asset tag;

resuming the monitoring of the asset tags within a shipment batch; and providing a dock location for the shipment batch, said shipment batch being loaded onto a transport device, wherein the dock location is displayed on a screen located on the asset tag.

9. The method for tracking freight as recited in claim 8, and further including a step of notifying a user of the freight tracking system that the shipment batch has been loaded onto the transport device and it ready for shipment.

10. The method for tracking freight as recited in claim 9, and further including the step of alerting a user subsequent departure of a transport device with a shipment batch stored thereon that at least one piece of the shipment batch is loaded onto the transport device.

11. The method for tracking freight as recited in claim 10, and further including the step of updating the status of the transport device within the freight tracking system subsequent departure of the transport device from its origination point.

12. The method for tracking freight as recited in claim 11, and further including the step of detecting a transport device at a destination location, wherein the detection of the transport device is facilitated by a warehouse gateway installed at the destination location.

13. The method for tracking freight as recited in claim 12, and further including the step of updating the location of the transport device in the database subsequent its arrival at the destination location.

14. The method for tracking freight as recited in claim 13, wherein the proximity distance parameter is within the range of 30 to 150 feet.

15. A method for tracking freight that is operable to establish position data for each item within an assigned shipment batch and wherein the each item is communicably coupled comprising steps of:
- installing a controller, said controller being a personal computer, said controller being operably coupled a network;
- installing at least one remote terminal, said remote terminal being a portable computing device, said at least one remote terminal being a tablet PC or a smart phone;
- installing a software application, said software application being installed on said controller and said at least one remote terminal, said software application operable to provide the operation of the freight tracking system;
- establishing a database, said database being established on a server;
- coupling the controller to the database, said coupling of the controller to the database being executed by a computer network connection;
- deploying a warehouse gateway, said warehouse gateway being operably coupled to said at least one remote terminal and said controller, said warehouse gateway including a transceiver, said transceiver configured to transmit and detect a signal;
- providing a plurality of asset tags, said asset tags having a housing, said asset tags being configured to be releasably secured to items within a shipment batch, said asset tags including a transmitter and receiver, said asset tags further including a visual warning indicator, said visual warning indicator operable to display a first color and a second color, said asset tags further including a display screen;
- identifying a shipment batch, said shipment batch comprising of more than one item, wherein the shipment batch is scheduled to ship to the same destination;
- allocating a portion of said plurality of asset tags, said plurality of asset tags secured to the shipment batch;
- pairing the portion of said plurality of asset tags selected for securement to the shipment batch to the warehouse gateway;
- assigning the portion of said plurality of asset tags to the shipment batch, wherein the shipment batch is provided with a unique shipment batch identification number;
- securing the portion of said plurality of asset tags assigned to the shipment batch;
- entering the shipment batch information into the software application, wherein the shipment batch information is inputted using a barcode located on said asset tag;
- linking the asset tags contained within the shipment batch, wherein communication between each asset tag within a shipment batch is established, said linking the asset tags operable to establish a mesh network wherein each asset tag secured to an assigned shipment batch is communicably connected to each other;
- entering the proximity distance parameter, wherein the proximity distance parameter for each asset tag within the shipment batch is entered into the freight tracking system;
- activating monitoring of each asset tag within the shipment batch;
- updating the database with position information of each asset tag, said updating the database occurring at regular intervals of time;
- detecting that at least one asset tag has exceeded the proximity distance parameter between itself and another asset tag within the shipment batch;
- alerting the users of the freight tracking system, wherein users of the freight tracking system are provided notification that an asset tag within a shipment batch has exceeded the proximity distance parameter;
- identifying a location of the asset tag within the shipment batch that is providing the signal that it has exceeded the proximity distance parameter;
- correcting the location of the asset tag;
- resuming the monitoring of the asset tags within a shipment batch;
- providing a dock location for the shipment batch, said shipment batch being loaded onto a transport device, wherein the dock location is displayed on a screen located on the asset tag;
- notifying a user of the freight tracking system that the shipment batch has been loaded onto the transport device and it ready for shipment;
- alerting a user subsequent departure of a transport device with a shipment batch stored thereon that at least one piece of the shipment batch is loaded onto the transport device;
- updating the status of the transport device within the freight tracking system subsequent departure of the transport device from its origination point; and
- detecting a transport device arrival at a destination location, wherein the detection of the transport device is facilitated by a warehouse gateway installed at the destination location.

16. The method for tracking freight as recited in claim 15, wherein the first color of the visual warning indicator is illuminated during all asset tags within the shipment batch being within the proximity distance parameter and wherein said first color is green.

17. The method for tracking freight as recited in claim 16, and further including the step of illuminating the visual warning indicator with a second color when one of said portion of said plurality of asset tags assigned to the shipment batch has exceeded the proximity distance parameter, wherein said second color is red.

18. The method for tracking freight as recited in claim 17, and further including the step of tracking the shipment batch subsequent its departure from a point of origin, wherein the shipment batch location is updated in the database.

19. The method for tracking freight as recited in claim 18, and further including the step of entering the shipment batch status of completed subsequent unloading of the shipment batch at the destination, wherein the shipment batch status is updated in the database.

20. The method for tracking freight as recited in claim 19, wherein the proximity distance parameter is within the range of 30 to 150 feet.

* * * * *